United States Patent
Beisel (10) Patent No.: US 10,895,254 B2
(45) Date of Patent: Jan. 19, 2021

(54) PRESSURE PUMP VALVE MONITORING SYSTEM

(71) Applicant: Halliburton Energy Services, Inc., Houston, TX (US)

(72) Inventor: Joseph A. Beisel, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 402 days.

(21) Appl. No.: 15/743,572

(22) PCT Filed: Sep. 4, 2015

(86) PCT No.: PCT/US2015/048610
§ 371 (c)(1),
(2) Date: Jan. 10, 2018

(87) PCT Pub. No.: WO2017/039695
PCT Pub. Date: Mar. 9, 2017

(65) Prior Publication Data
US 2018/0202433 A1  Jul. 19, 2018

(51) Int. Cl.
*F04B 51/00* (2006.01)
*F04B 1/00* (2020.01)
(Continued)

(52) U.S. Cl.
CPC ............ *F04B 51/00* (2013.01); *F04B 1/00* (2013.01); *F04B 9/045* (2013.01); *F04B 19/04* (2013.01);
(Continued)

(58) Field of Classification Search
CPC .. F04B 51/00; F04B 1/00; F04B 47/02; F04B 47/04; F04B 9/045; F04B 49/065;
(Continued)

(56) References Cited

U.S. PATENT DOCUMENTS 3,921,435 A  11/1975 Howard
4,333,424 A   6/1982 McFee
(Continued)

FOREIGN PATENT DOCUMENTS

CA      2993150       9/2019
WO    2011095935      8/2011
(Continued)

OTHER PUBLICATIONS

International Patent Application No. PCT/US2015/048588, "International Search Report and Written Opinion", dated May 4, 2016, 8 pages.
(Continued)

*Primary Examiner* — Alexander Satanovsky
*Assistant Examiner* — Mark I Crohn
(74) *Attorney, Agent, or Firm* — Kilpatrick Townsend & Stockton LLP (57) ABSTRACT

A monitoring system may include a position sensor, a strain gauge, and a computing device for determining the condition of a valve in a chamber of a pump using strain measurements. The strain gauge may determine strain in the chamber. The position sensor may determine the position of a crankshaft coupled to a plunger in the chamber. The computing device may receive signals generated by the strain gauge and the position sensor related to the strain in the chamber and the position of the crankshaft, respectively, and may process the signals to determine delays in the actuation of the valves.

21 Claims, 8 Drawing Sheets

(51) Int. Cl.
| | |
|---|---|
| *F04B 47/00* | (2006.01) |
| *F04B 47/04* | (2006.01) |
| *F04B 49/06* | (2006.01) |
| *G01B 7/00* | (2006.01) |
| *F04B 19/04* | (2006.01) |
| *F04B 9/04* | (2006.01) |
| *F04B 47/02* | (2006.01) |

(52) U.S. Cl.
CPC .............. *F04B 47/02* (2013.01); *F04B 47/04* (2013.01); *F04B 49/065* (2013.01); *G01B 7/003* (2013.01); *F04B 2201/0601* (2013.01); *F04B 2201/0603* (2013.01); *F04B 2201/1208* (2013.01); *F04B 2205/03* (2013.01)

(58) Field of Classification Search
CPC .............. F04B 19/04; F04B 2201/0603; F04B 2201/0601; F04B 2201/1208; F04B 2205/03; F04B 49/00; G01B 7/003
See application file for complete search history.

(56) References Cited

U.S. PATENT DOCUMENTS

| | | | |
|---|---|---|---|
| 4,705,459 | A | 11/1987 | Buisine et al. |
| RE33,649 | E | 7/1991 | Kawai |
| 5,846,056 | A | 12/1998 | Dhindsa et al. |
| 6,155,347 | A | 12/2000 | Mills |
| 6,859,740 | B2 | 2/2005 | Stephenson et al. |
| 6,882,960 | B2 | 4/2005 | Miller et al. |
| 7,043,975 | B2 | 5/2006 | Du |
| 7,623,986 | B2 | 11/2009 | Miller et al. |
| 8,807,960 | B2 | 8/2014 | Stephenson et al. |
| 9,759,213 | B2 | 9/2017 | Bassett et al. |
| 10,480,296 | B2 | 11/2019 | Beisel |
| 10,564,020 | B2 | 2/2020 | Beisel |
| 2002/0007952 | A1 | 1/2002 | Vann |
| 2002/0176784 | A1 | 11/2002 | Du |
| 2004/0018100 | A1* | 1/2004 | Takagi ................. F04B 43/046 417/322 |
| 2004/0144529 | A1* | 7/2004 | Barnes .................... F04B 47/02 166/53 |
| 2004/0158419 | A1 | 8/2004 | Pearson et al. |
| 2005/0180868 | A1 | 8/2005 | Miller |
| 2006/0037408 | A1 | 2/2006 | Peter |
| 2007/0041849 | A1 | 2/2007 | Allen |
| 2007/0139211 | A1 | 6/2007 | Pessin et al. |
| 2007/0140869 | A1 | 6/2007 | St. Michel et al. |
| 2008/0260558 | A1 | 10/2008 | Luongo et al. |
| 2009/0041588 | A1* | 2/2009 | Hunter ................. F04B 7/0076 417/27 |
| 2009/0129935 | A1 | 5/2009 | Kunkler et al. |
| 2009/0317262 | A1 | 12/2009 | Gilpatrick |
| 2010/0300683 | A1 | 12/2010 | Looper et al. |
| 2011/0046903 | A1 | 2/2011 | Franklin |
| 2012/0144995 | A1 | 6/2012 | Bayyouk et al. |
| 2013/0151216 | A1 | 6/2013 | Palka et al. |
| 2013/0261993 | A1 | 10/2013 | Ruchti et al. |
| 2014/0096957 | A1 | 4/2014 | Van Zuilekom et al. |
| 2014/0166267 | A1 | 6/2014 | Weightman et al. |
| 2014/0288858 | A1 | 9/2014 | Franklin |
| 2015/0027693 | A1 | 1/2015 | Edwards et al. |
| 2016/0305419 | A1 | 10/2016 | Liu et al. |
| 2017/0138645 | A1 | 5/2017 | Sakima et al. |

FOREIGN PATENT DOCUMENTS

| | | |
|---|---|---|
| WO | 2017039692 | 3/2017 |
| WO | 2017039698 | 3/2017 |
| WO | 2017039700 | 3/2017 |
| WO | 2017039701 | 3/2017 |

OTHER PUBLICATIONS

International Patent Application No. PCT/US2015/048610 , "International Search Report and Written Opinion", dated May 4, 2016, 9 pages.
International Patent Application No. PCT/US2015/048647 , "International Search Report and Written Opinion", dated May 4, 2016, 8 pages.
International Patent Application No. PCT/US2015/048673 , "International Search Report and Written Opinion", dated Jun. 3, 2016, 15 pages.
International Patent Application No. PCT/US2015/048696 , "International Search Report and Written Opinion", dated May 4, 2016, 8 pages.
U.S. Appl. No. 15/743,178 , "Non-Final Office Action", dated Feb. 5, 2020, 28 pages.
U.S. Appl. No. 15/743,178 , "Notice of Allowance", dated May 14, 2020, 8 pages.
U.S. Appl. No. 15/743,405 , "Notice of Allowance", dated Oct. 30, 2019, 9 pages.
U.S. Appl. No. 15/745,597 , "Non-Final office Action", dated Feb. 20, 2020, 14 pages.
U.S. Appl. No. 15/745,644 , "Notice of Allowance", dated Jul. 10, 2019, 8 pages.
CA2,993,150 , "Notice of Allowance", dated Jun. 27, 2019, 1 page.
CA2,993,150 , "Office Action", dated Oct. 30, 2018, 4 pages.

* cited by examiner

PRESSURE PUMP VALVE MONITORING SYSTEM

TECHNICAL FIELD

The present disclosure relates generally to pressure pumps for a wellbore and, more particularly (although not necessarily exclusively), to monitoring pressure pump valves using strain measurements.

BACKGROUND

Pressure pumps may be used in wellbore treatments. For example, hydraulic fracturing (also known as "fracking" or "hydro-fracking") may utilize a pressure pump to introduce or inject fluid at high pressures into a wellbore to create cracks or fractures in downhole rock formations. Due to the high-pressured and high-stressed nature of the pumping environment, pressure pump parts may undergo mechanical wear and require frequent replacement. The frequent change of parts may result in additional costs for the replacement parts and additional time due to the delays in operation while the replacement parts are installed.

DETAILED DESCRIPTION

Certain aspects and examples of the present disclosure relate to a monitoring system for determining the performance of a pressure pump based on monitoring one of one or more valves in the pressure pump using strain measurements. The pressure pump may be in fluid communication with an environment of a wellbore. The pressure pump may include a chamber on a fluid end of the pressure pump for receiving and discharging fluid for injecting the fluid into the wellbore. A suction valve in the chamber may be actuated to open and close to allow fluid to enter the chamber in response to the movement of a plunger in the chamber. A discharge valve in the chamber may be actuated to open and close to allow fluid to exit the chamber in response to the movement of the plunger. As fluid is received and discharged from the chamber, strain in the fluid end fluctuates. A monitoring system may determine strain in the fluid end based on a strain signal. The strain signal may be generated by a strain gauge coupled to the fluid end of the pressure pump and may represent strain in the chamber. In some aspects, the monitoring system may determine actuation points representing the opening and closing of the suction and discharge valves in the chamber based on discontinuities in the strain signal.

A monitoring system according to some aspects may also determine a position of the plunger in the chamber at the time of the valve actuation. The position of the plunger may be determined by cross-referencing the actuation points of the valves with a position signal generated by a position sensor coupled to the power end of the pressure pump and representing the position of a crankshaft mechanically coupled to the plunger. The monitoring system may correlate the actuation points with the position of the plunger to determine actuation angles corresponding to delays in the actuation of the valves. The actuation delays of the valves may correspond to a condition of the valves or other condition in the chamber of the pressure pump. For example, the monitoring system may be programmable to determine the expected actuation points of the valves. The monitoring system may determine all possible valve-timing conditions to determine a correct diagnosis where one of the valves is determined to fall outside of the expected values. For example, the diagnosis may indicate a leak in a valve (e.g., represented by a delayed sealing), a failed valve (represented by no load up in the chamber of the pressure pump), or another condition of the pressure pump determinable from the valve timing conditions.

A monitoring system according to some aspects may allow the performance of the chamber to be determined without breaching the external surface of the pressure pump. For example, the strain gauge may be positioned on the external surface of the fluid end of the pressure pump and the position sensor may be positioned on an external surface of the power end of the pressure pump to measure and generate signals corresponding to the strain in the chamber and the position of the crankshaft, respectively. In this manner, an additional stress concentration is not added to the pressure pump in the form of a hole or other breach of the pressure pump to access an interior of the fluid end. Eliminating or not including additional stress concentration caused by a breach of the pressure pump may extend the fatigue life of the pressure pump. Further, a monitoring system may determine the performance of the chamber using strain measurements, as opposed to pressure or other measurements for determining the internal conditions of the chamber to allow for relaxed requirements in the accuracy of the strain gauge. Based on the ability of the strain gauge to characterize the loading and unloading of the strain in the signal (even without knowing the precise amount of strain or pressure in the chamber), the monitoring system may be able to accurately determine the actuation of a valve in the pressure pump.

A monitoring system according to some aspects may also protect components of the pressure pump from over fatigue due to a hung open or blown out valve. The monitoring system may determine the performance of the components throughout the operation of the pressure pump to allow maintenance in the fluid end of the pressure pump to be performed on an as-needed basis, rather than scheduled by a predetermined number of stages. The reduced downtime caused by prescheduled and unnecessary maintenance may lead to cost savings in the number of valves used and replaced as well as in the time and labor saved in performing pump maintenance.

Figure 1A:
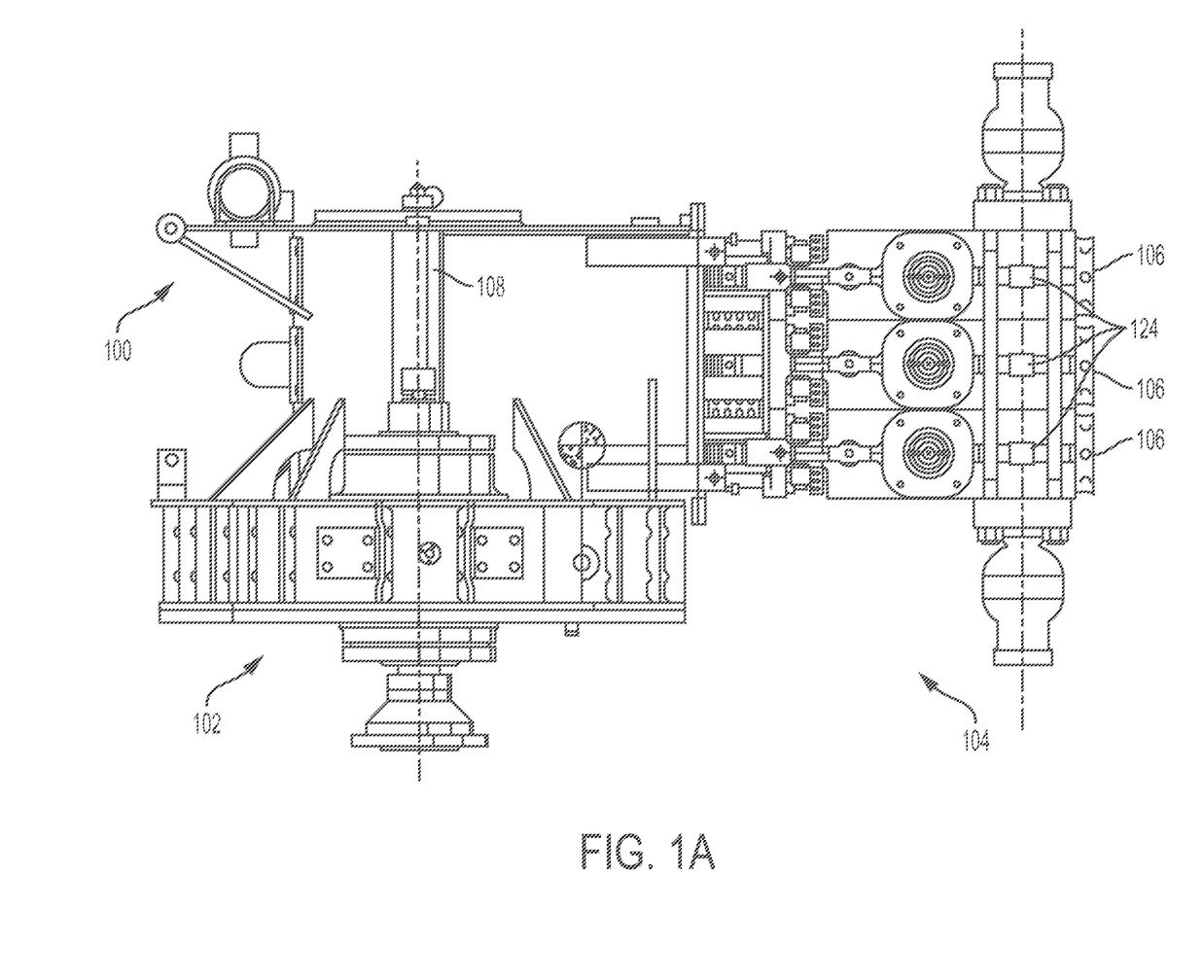
FIG. 1A is a cross-sectional, top view schematic diagram depicting an example of a pressure pump that may include a monitoring system according to one aspect of the present disclosure.
Figure 1B:
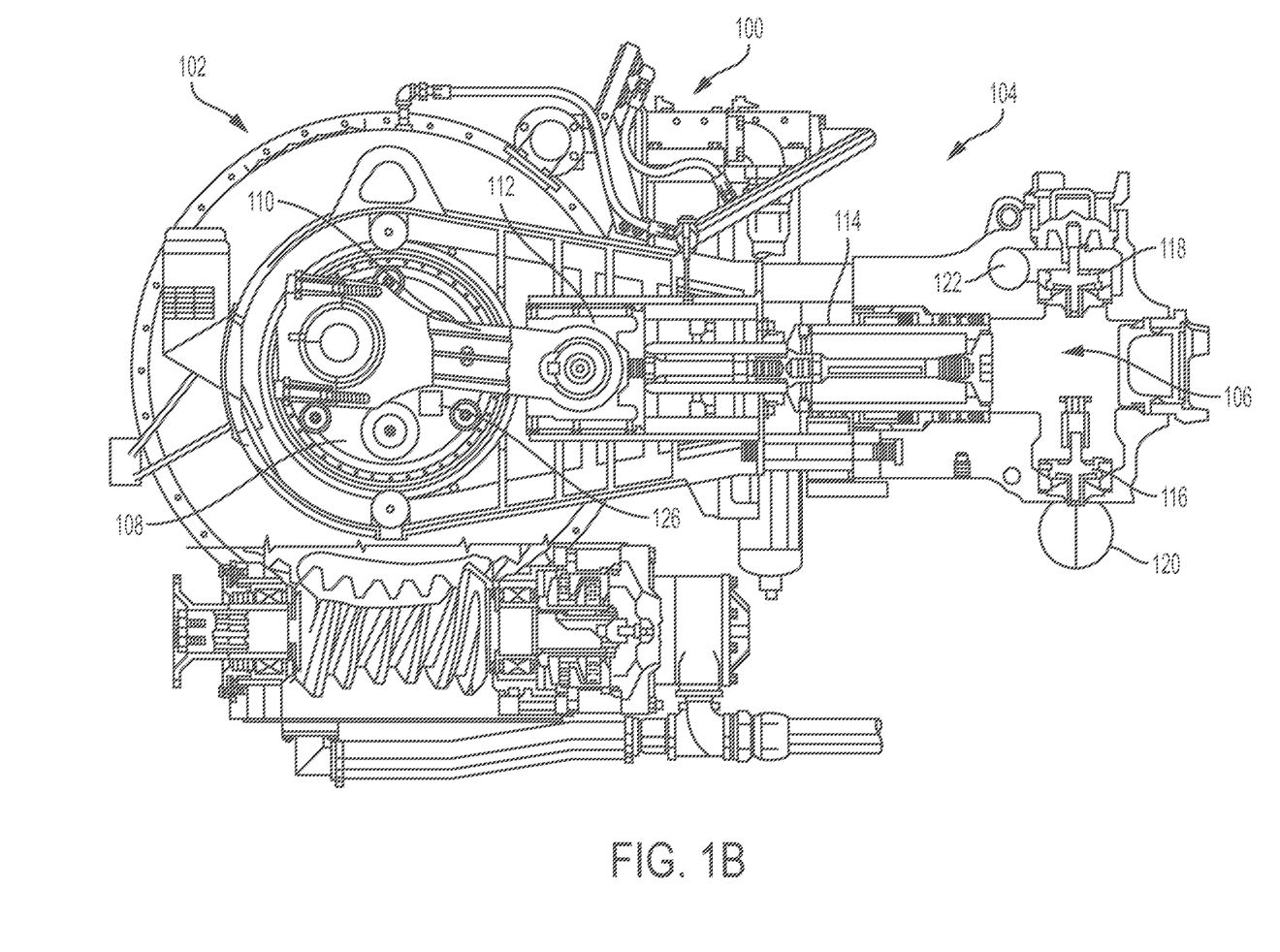
FIG. 1B is a cross-sectional, side view schematic diagram depicting the pressure pump of FIG. 1A according to one aspect of the present disclosure.

FIGS. 1A and 1B show a pressure pump 100 that may utilize a monitoring system according to some aspects of the present disclosure. The pressure pump 100 may be any positive displacement pressure pump. The pressure pump 100 may include a power end 102 and a fluid end 104. The power end 102 may be coupled to a motor, engine, or other prime mover for operation. The fluid end 104 includes chambers 106 for receiving and discharging fluid flowing through the pressure pump 100. Although FIG. 1A shows three chambers 106 in the pressure pump 100, the pressure pump 100 may include any number of chambers 106, including one, without departing from the scope of the present disclosure.

The pressure pump 100 may also include a rotating assembly. The rotating assembly may include a crankshaft 108, one or more connecting rods 110, a crosshead 112, plungers 114, and related elements (e.g., pony rods, clamps, etc.). The crankshaft 108 may be positioned on the power end 102 of the pressure pump 100 and may be mechanically connected to a plunger in a chamber 106 of the pressure pump via the connecting rod 110 and the crosshead 112. The power end 102 may include an external casing or crankcase. The crankshaft 108 may cause a plunger 114 located in a chamber 106 to displace any fluid in the chamber 106. In some aspects, each chamber 106 of the pressure pump 100 may include a separate plunger 114, each plunger 114 in each chamber 106 mechanically connected to the crankshaft 108 via the connecting rod 110 and the crosshead 112. Each chamber 106 may include a suction valve 116 and a discharge valve 118 for absorbing fluid into the chamber 106 and discharging fluid from the chamber 106, respectively. The fluid may be absorbed into and discharged from the chamber 106 in response to a movement of the plunger 114 in the chamber 106. Based on the mechanical coupling of the crankshaft 108 to the plunger 114 in the chamber 106, the movement of the plunger 114 may be directly related to the movement of the crankshaft 108.

A suction valve 116 and a discharge valve 118 may be included in each chamber 106 of the pressure pump 100. In some aspects, the suction valve 116 and the discharge valve 118 may be passive valves. As the plunger 114 operates in the chamber 106, the plunger 114 may impart motion and pressure to the fluid by direct displacement. The suction valve 116 and the discharge valve 118 may open and close based on the displacement of the fluid in the chamber 106 by the operation of the plunger 114. For example, the suction valve 116 may be opened during a recession of the plunger 114 to provide absorption of fluid from outside of the chamber 106 into the chamber 106. As the plunger 114 is withdrawn from the chamber 106, a partial suction may be created to open the suction valve 116 to allow fluid to enter the chamber 106. In some aspects, the fluid may be absorbed into the chamber 106 from an inlet manifold 120. Fluid already in the chamber 106 may move to fill the space where the plunger 114 was located in the chamber 106. The discharge valve 118 may be closed during this process.

The discharge valve 118 may be opened as the plunger 114 moves forward, or reenters, the chamber 106. As the plunger 114 moves further into the chamber 106, the fluid may be pressurized. The suction valve 116 may be closed during this time to allow the pressure on the fluid to force the discharge valve 118 to open and discharge fluid from the chamber 106. In some aspects, the discharge valve 118 may discharge the fluid into a discharge manifold 122. The loss of pressure inside the chamber 106 may allow the discharge valve 118 to close and the cycle may restart. Together, the suction valve 116 and the discharge valve 118 may operate to provide the fluid flow in a desired direction. The process may include a measurable amount of pressure and stress in the chamber 106, the stress resulting in strain to the chamber 106 or fluid end 104 of the pressure pump 100. In some aspects, a monitoring system may be coupled to the pressure pump 100 to gauge the strain and determine a condition of the suction valve 116 and the discharge valve 118 in the chamber 106.

In some aspects, a monitoring system according to some aspects of the present disclosure may be coupled to the pressure pump 100 to gauge the strain and determine actuation of the suction valve 116 and the discharge valve 118 in the chamber 106. For example, a monitoring system may include strain gauges positioned on an external surface of the fluid end 104 to gauge strain in the chambers 106. Blocks 124 in FIG. 1A show an example placement for the strain gauges that may be included in the monitoring system. In some aspects, the monitoring system may include a separate strain gauge to monitor strain in each chamber 106 of the pressure pump 100. In some aspects, a monitoring system according to some aspects may also include one or more position sensors for sensing the position of the crankshaft 108. Measurements of the crankshaft position may allow the monitoring system to determine the position of the plungers 114 in the respective chambers 106. A position sensor of the monitoring system may be positioned on an external surface of the pressure pump 100. Block 126 shows an example placement of a position sensor on an external surface of the power end 102 to sense the position of the crankshaft 108. In some aspects, measurements from the position sensor may be correlated with the measurements from the strain gauges to determine actuation delays corresponding to the valves 116, 118 in each chamber 106 of the pressure pump 100 for identifying cavitation in the fluid end 104.

Figure 2:
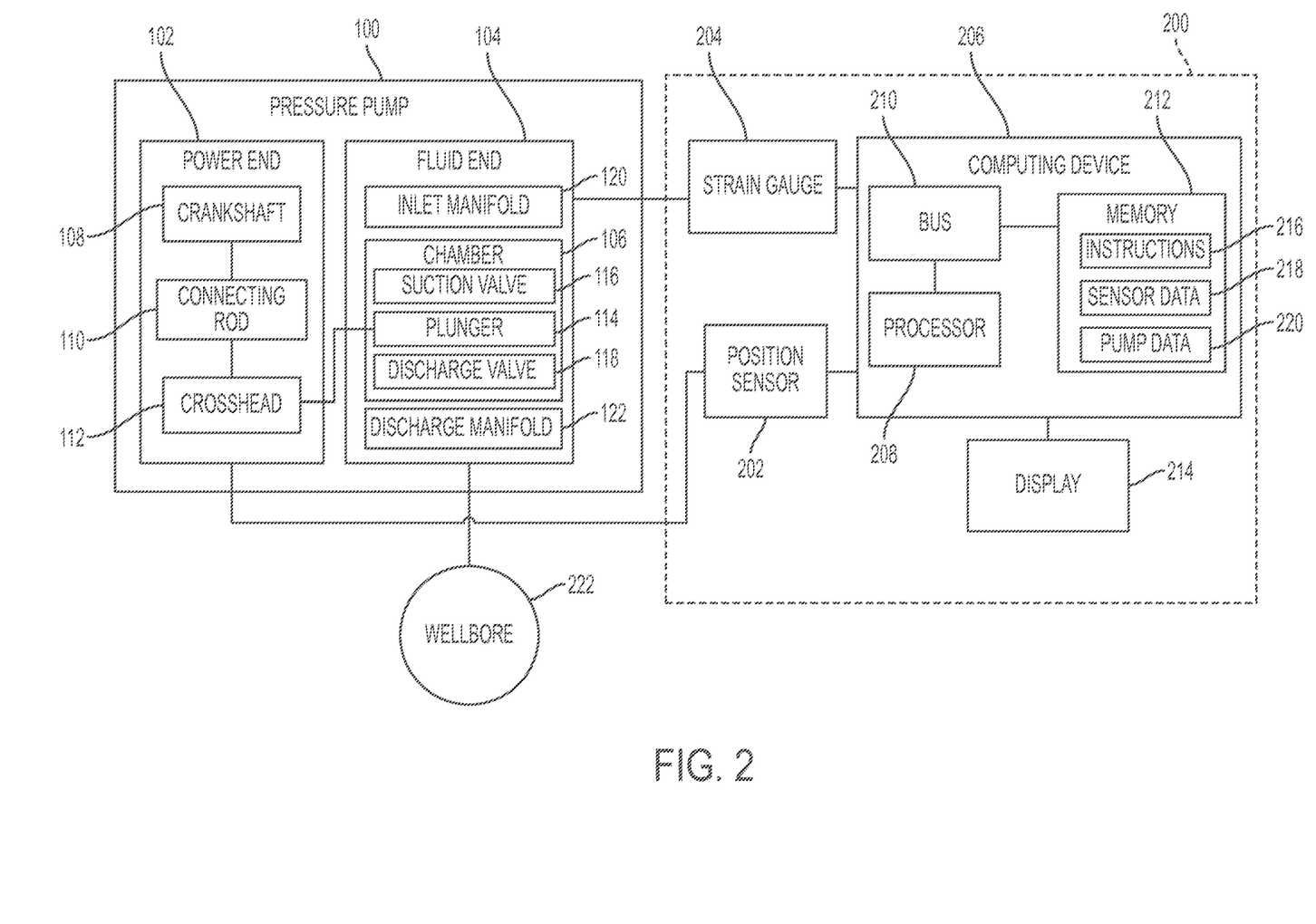
FIG. 2 is a block diagram depicting a monitoring system for a pressure pump according to one aspect of the present disclosure.

FIG. 2 is a simple block diagram showing an example of a monitoring system 200 coupled to the pressure pump 100. The monitoring system 200 may include a position sensor 202, a strain gauge 204, and a computing device 206. The position sensor 202 and the strain gauge 204 may be coupled to the pressure pump 100. The position sensor 202 may include a single sensor or may represent an array of sensors. The position sensor 202 may be a magnetic pickup sensor capable of detecting ferrous metals in close proximity. The position sensor 202 may be positioned on the power end 102 of the pressure pump 100 for determining the position of the crankshaft 108. In some aspects, the position sensor 202 may be placed proximate to a path of the crosshead 112. The path of the crosshead 112 may be directly related to a rotation of the crankshaft 108. The position sensor 202 may sense the position of the crankshaft 108 based on the movement of the crosshead 112. In other aspects, the position sensor 202 may be placed on a crankcase or external casing of the power end 102 as illustrated by block 126 in FIG. 1A. The position sensor 202 may determine a position of the crankshaft 108 by detecting a bolt pattern of the crankshaft 108 as it rotates during operation of the pressure pump 100. In each aspect, the position sensor 202 may generate a signal representing the position of the crankshaft 108 and transmit the signal to the computing device 206.

The strain gauge 204 may be positioned on the fluid end 104 of the pressure pump 100. The strain gauge 204 may include a single gauge or an array of gauges for determining strain in the chamber 106. Non-limiting examples of types of strain gauges may include electrical resistance strain gauges, semiconductor strain gauges, fiber optic strain gauges, micro-scale strain gauges, capacitive strain gauges, vibrating wire strain gauges, etc. In some aspects, the monitoring system 200 may include a strain gauge 204 for each chamber 106 of the pressure pump 100 to determine strain in each of the chambers 106, respectively. In some aspects, the strain gauge 204 may be positioned on an external surface of the fluid end 104 of the pressure pump 100 in a position subject to strain in response to stress in the chamber 106. For example, the strain gauge 204 may be positioned on a section of the fluid end 104 in a manner such that when the chamber 106 loads up, strain may be present at the location of the strain gauge 204. This location may be determined based on engineering estimations, finite element analysis, or by some other analysis. For example, finite element analysis may determine that strain in the chamber 106 may be directly over a plunger bore of the chamber 106 during load up. The strain gauge 204 may be placed on an external surface of the pressure pump 100 in a location directly over the plunger bore corresponding to the chamber 106 as illustrated by blocks 124 in FIG. 1A to measure strain in the chamber 106. The strain gauge 204 may generate a signal representing strain in the chamber 106 and transmit the signal to the processor 208.

The computing device 206 may be coupled to the position sensor 202 and the strain gauge 204 to receive the generated signals from the position sensor 202 and the strain gauge 204. The computing device 206 may include a processor 208, a bus 210, and a memory 212. In some aspects, the monitoring system 200 may also include a display unit 214. The processor 208 may execute instructions 216 including one or more operation for determining the condition of the valves 116, 118 or other performance issues in the chamber 106. The instructions 216 may be stored in the memory 212 coupled to the processor 208 by the bus 210 to allow the processor 208 to perform the operations. The processor 208 may include one processing device or multiple processing devices. Non-limiting examples of the processor 208 may include a Field-Programmable Gate Array ("FPGA"), an application-specific integrated circuit ("ASIC"), a microprocessor, etc.

The non-volatile memory 212 may include any type of memory device that retains stored information when powered off. Non-limiting examples of the memory 212 may include electrically erasable and programmable read-only memory ("EEPROM"), a flash memory, or any other type of non-volatile memory. In some examples, at least some of the memory 212 may include a medium from which the processor 208 can read the instructions 216. A computer-readable medium may include electronic, optical, magnetic or other storage devices capable of providing the processor 208 with computer-readable instructions or other program code (e.g., instructions 216). Non-limiting examples of a computer-readable medium include (but are not limited to) magnetic disks(s), memory chip(s), ROM, random-access memory ("RAM"), an ASIC, a configured processor, optical storage, or any other medium from which a computer processor can read the instructions 216. The instructions 216 may include processor-specific instructions generated by a compiler or an interpreter from code written in any suitable computer-programming language, including, for example, C, C++, C #, etc.

In some examples, the computing device 206 may determine an input for the instructions 216 based on sensor data 218 from the position sensor 202 or the strain gauge 204, data input into the computing device 206 by an operator, or other input means. For example, the position sensor 202 or the strain gauge 204 may measure a parameter associated with the pressure pump 100 (e.g., the position of the crankshaft 108, strain in the chamber 106) and transmit associated signals to the computing device 206. The computing device 206 may receive the signals, extract data from the signals, and store the sensor data 218 in memory 212.

In some aspects, the computing device 206 may generate graphical interfaces associated with the sensor data 218 and information generated by the processor 208 therefrom to be displayed via a display unit 214. The display unit 214 may be coupled to the processor 208 and may include any CRT, LCD, OLED, or other device for displaying interfaces generated by the processor 208. In some aspects, the computing device 206 may also generate an alert or other communication of the performance of the pressure pump 100 based on determinations by the computing device 206 in addition to the graphical interfaces. For example, the display unit 214 may include audio components to emit an audible signal when an ill condition is present in the pressure pump 100.

In some aspects, in addition to the monitoring system 200, the pressure pump 100 may also be coupled to a wellbore 220. For example, the pressure pump 100 may be used in hydraulic fracturing to inject fluid into the wellbore 220. Subsequent to the fluid passing through the chambers 106 of the pressure pump 100, the fluid may be injected into the wellbore 220 at a high pressure to break apart or otherwise fracture rocks and other formations in the wellbore 220 to release hydrocarbons. The monitoring system 200 may monitor the suction valve 116 and the discharge valve 118 to determine when to halt the fracturing process for maintenance of the pressure pump 100. Although hydraulic fracturing is described here, the pressure pump 100 may be used for any process or environment requiring a positive displacement pressure pump.

Figure 3:
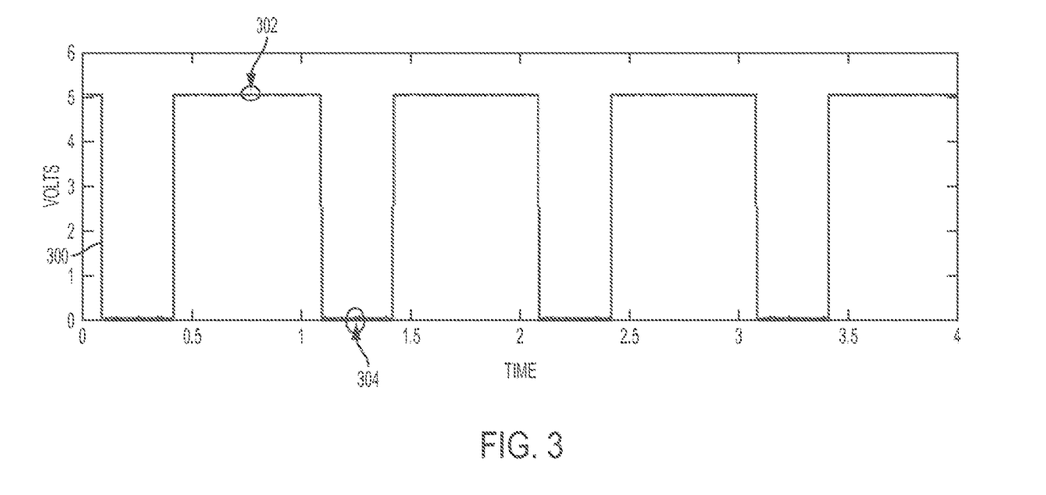
FIG. 3 is a signal graph depicting a signal generated by a position sensor of the monitoring system of FIG. 2 according to one aspect of the present disclosure.
Figure 4:
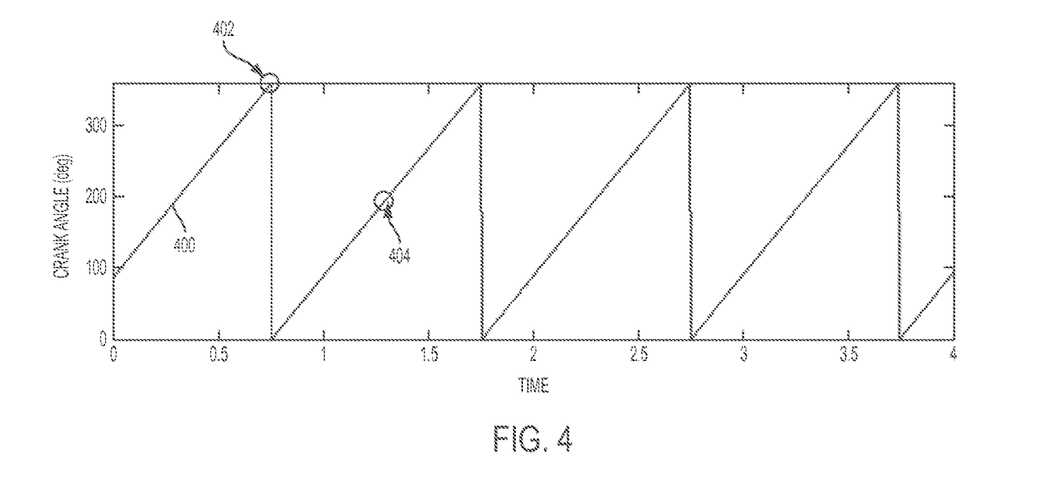
FIG. 4 is a signal graph depicting an alternative signal generated by a position sensor of the monitoring system of FIG. 2 according to one aspect of the present disclosure.

FIGS. 3 and 4 show position signals 300, 400 generated by the position sensor 202 during operation of the crankshaft 108. In some aspects, the position signals 300, 400 may be shown on the display unit 214 in response to generation of graphical representation of the position signals 300, 400 by the computing device 206. FIG. 3 shows a position signal 300 displayed in volts over time (in seconds). The position signal 300 may be generated by the position sensor 202 coupled to the power end 102 of the pressure pump 100 and positioned in a path of the crosshead 112. The position signal 300 may represent the position of the crankshaft 108 over the indicated time as the crankshaft 108 operates to cause the plunger 114 to move in the chamber 106. The mechanical coupling of the plunger 114 to the crankshaft 108 may allow the computing device 206 to determine a position of the plunger 114 relative to the position of the crankshaft 108 based on the position signal 300. In some aspects, the computing device 206 may determine plunger position reference points 302, 304, 402, 404 based on the position signal 300 generated by the position sensor 202. For example, the processor 208 may determine dead center positions of the plunger 114 based on the position signal 300. The dead center positions may include the position of the plunger 114 in which it is farthest from the crankshaft 108, known as the top dead center. The dead center positions may also include the position of the plunger 114 in which it is nearest to the crankshaft 108, known as the bottom dead center. The distance between the top dead center and the bottom dead center may represent the length of a full stroke of the plunger 114 operating in the chamber 106.

In FIG. 3, the top dead center is represented by reference point 302 and the bottom dead center is represented by reference point 304. In some aspects, the processor 208 may determine the reference points 302, 304 by correlating the position signal 300 with a known ratio or other value representing the relationship between the movement of the crankshaft 108 and the movement of the plunger 114 (e.g., the mechanical correlations of the crankshaft 108 to the plunger 114 based on the mechanical coupling of the crankshaft 108 to the plunger 114 in the pressure pump 100). The computing device 206 may determine the top dead center and bottom dead center based on the position signal 300 or may determine other plunger position reference points to determine the position of the plunger over the operation time of the pressure pump 100.

FIG. 4 shows a position signal 400 displayed in degrees over time (in seconds). The degree value may represent the angle of the crankshaft 108 during operation of the crankshaft 108 or pressure pump 100. In some aspects, the position signal 400 may be generated by the position sensor 202 located directly on a crankcase of the crankshaft 108. The position sensor 202 may generate the position signal 400 based on the bolt pattern of the position sensor 202 as it rotates in response to the rotation of the crankshaft 108 during operation. Similar to the position signal 300 shown in FIG. 3, the computing device 206 may determine plunger position reference points 302, 304, 402, 404 based on the position signal 400. The reference points 402, 404 in FIG. 4 represent the top dead center and bottom dead center of the plunger 114 for the chamber 106 during operation of the pressure pump 100.

Figure 5:
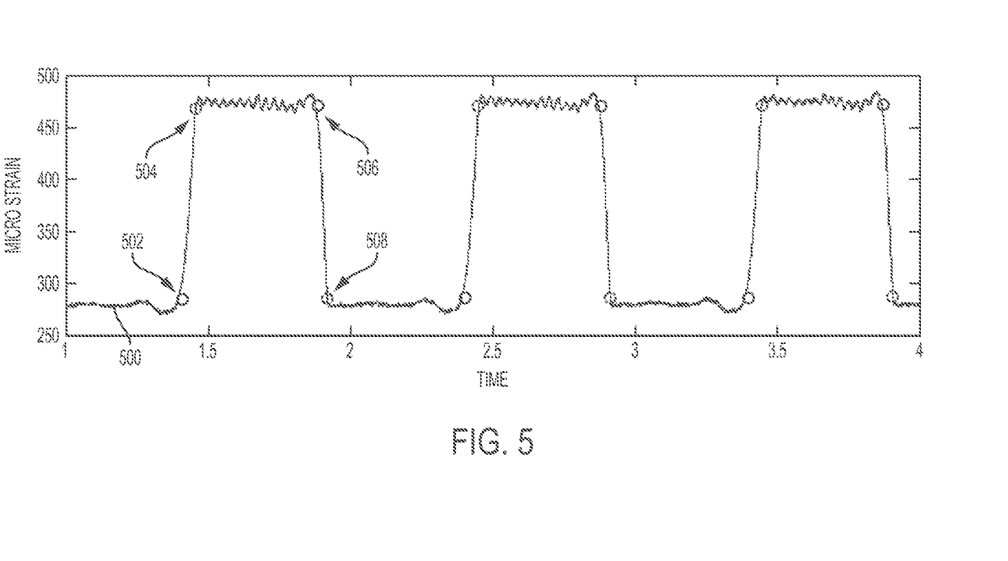
FIG. 5 is a signal graph depicting a signal generated by a strain gauge of the monitoring system of FIG. 2 according to one aspect of the present disclosure.

FIG. 5 shows a raw strain signal 500 generated by the strain gauge 204 coupled to the fluid end 104 of the pressure pump 100 and positioned on an external surface of the fluid end 104. The strain signal 500 may represent strain measured by the strain gauge 204 in the chamber 106 of the pressure pump 100. The computing device 206 may determine the actuation points 502, 504, 506, 508 of the suction valve 116 and the discharge valve 118 for the chamber 106 based on the strain signal 500. The actuation points 502, 504, 506, 508 may represent the point in time where the suction valve 116 and the discharge valve 118 open and close. For example, the computing device 206 may execute the instructions 216 stored in the memory 212 and including signal-processing algorithms to determine the actuation points 502, 504, 506, 508. For example, the computing device 206 may execute instruction 216 to determine the actuation points 502, 504, 506, 508 by determining discontinuities in the strain signal 500. The stress in the chamber 106 may change during the operation of the suction valve 116 and the discharge valve 118 to cause the discontinuities in the strain signal 500 during actuation of the valves 116, 118 and the computing device 206 may identify the discontinuities as the opening and closing of the valves 116, 118. In one example, the strain in the chamber 106 may be isolated to the fluid in the chamber 106 when the suction valve 116 is closed. The isolation of the strain may cause the strain in the chamber 106 to load up until the discharge valve 118 is opened. When the discharge valve 118 is opened, the strain may level until the discharge valve 118 is closed, at which point the strain may unload until the suction valve 116 is reopened. The discontinuities may be present when the strain signal 500 shows a sudden increase or decrease in value corresponding to the actuation of the valves 116, 118.

In FIG. 5, actuation point 502 represents the suction valve 116 closing, actuation point 504 represents the discharge valve 118 opening, actuation point 506 represents the discharge valve 118 closing, and actuation point 508 represents the suction valve 116 opening to resume the cycle of fluid into and out of the chamber 106. In some aspects, the computing device 206 may cause the display unit 214 to display the strain signal 500 and the actuation points 502, 504, 506, 508 as shown in FIG. 5. The exact magnitudes of strain or pressure in the chamber 106 determined by the strain gauge 204 may not be required for determining the actuation points 502, 504, 506, 508. The computing device 206 may determine the actuation points 502, 504, 506, 508 based on the strain signal 500 providing a characterization of the loading and unloading of the strain in the chamber 106. In some aspects, the actuation points 502, 504, 506, 508 may be cross-referenced with the position signals 300, 400 to determine an actual position of the plunger 114 at the time of valve actuation.

Figure 6:
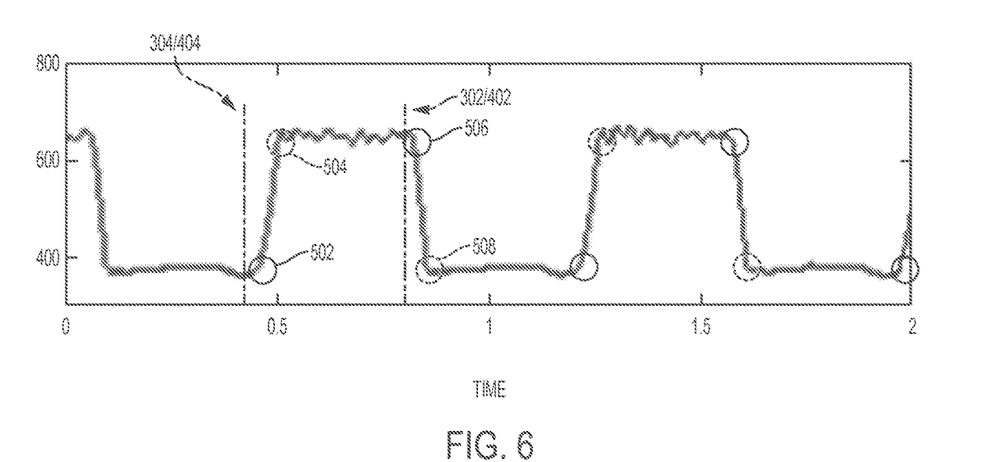
FIG. 6 is a signal graph depicting actuation of a suction valve and a discharge valve relative to the strain signal of FIG. 5 and a plunger position according to one aspect of the present disclosure.
Figure 7:
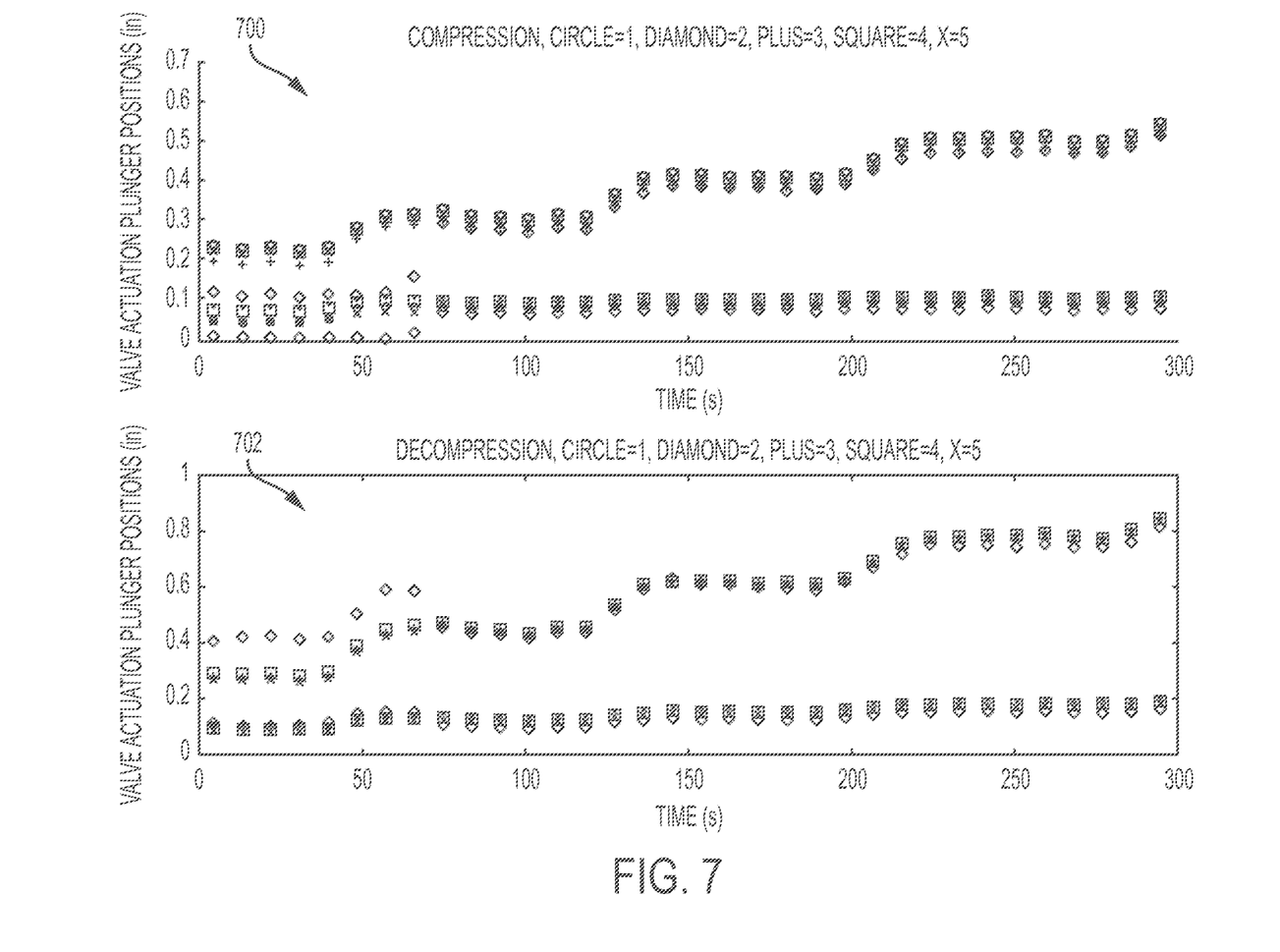
FIG. 7 is a dual plot graph depicting actuation delays of the suction valve and the discharge valve according to one aspect of the present disclosure.
Figure 8:
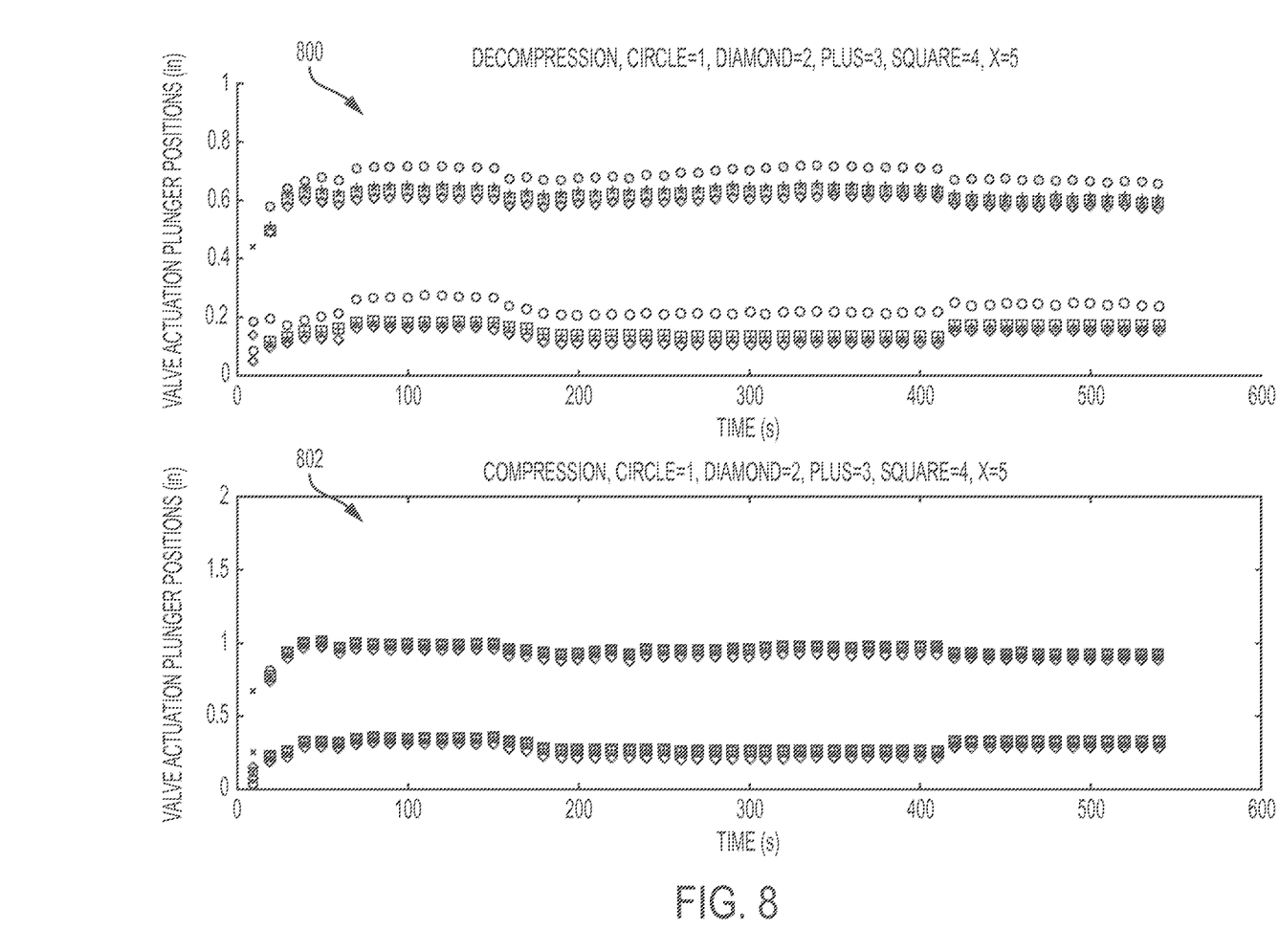
FIG. 8 is a dual plot graph depicting alternative actuation delays of the suction valve and the discharge valve according to one aspect of the present disclosure.

FIGS. 6-8 show the actuation of the suction valve 116 and the discharge valve 118 relative to the plunger position reference points 302, 304, 402, 404. In some aspects, the graphs depicted in FIGS. 6-8 may be displayed on the display unit 214. The time distance between the actuation points 502, 504, 506, 508 and the plunger position reference points 302, 304, 402, 404 may represent delays in the actuation (e.g., opening and closing) of the suction valve 116 and the discharge valve 118. FIG. 6 shows the strain signal 500. The actuation points 502, 504, 506, 508 of the suction valve 116 and the discharge valve 118 are plotted at the discontinuities in the strain signal 500 as described with respect to FIG. 5. Additionally, the reference points 302, 304, 402, 404 representing the top dead center and bottom dead center of the plunger 114 are plotted. The time between the closing of the suction valve 116 (represented by actuation point 502) and the bottom dead center (represented by reference points 304, 404) may represent a delay in the closing of the suction valve 116. The time between the opening of the discharge valve 118 (represented by actuation point 504) and the bottom dead center (represented by reference points 304, 404) may represent a delay in the opening of the discharge valve 118. Similarly, the time between the closing of the discharge valve 118 (represented by actuation point 504) and the top dead center (represented by reference points 302, 402) may represent a delay in the closing of the discharge valve 118. And, the amount of time between the opening of the suction valve 116 (represented by actuation point 508) and the top dead center (represented by reference points 302, 402) may represent a delay in the opening of the suction valve 116.

In FIG. 7, the actuation of the suction valve 116 and the discharge valve 118 is shown relative to the position of the plunger 114 at the bottom dead center (represented by reference points 304, 404) for closure of the suction valve 116 and opening of the discharge valve 118 and relative to the position of the plunger 114 at top dead center (represented by reference points 302, 402) for opening of the suction valve 116 and closing of the discharge valve 118. FIG. 7 shows the actuation values based on linear distance corresponding to the movement of the plunger 114, but the computing device 206 may similarly cause the display unit 214 to display the actuation values in units of degrees of rotation. FIG. 7 shows valves 116, 118 for multiple chambers 106 of the pressure pump 100. Different symbols may represent each chamber 106 (e.g., valves 116, 118 in a first chamber 106 may be represented by a circle, valves 116, 118 in a second chamber 106 may be represented by a diamond, etc.). The decompression side 700 shows the actuation of the valves 116, 118 referenced from the top dead center of the plunger 114. The compression side 702 shows the actuation of the valves 116, 118 referenced from the bottom dead center of the plunger 114. The darker symbols having the lower-trending values on each side may represent valve closings and the lighter symbols having the higher-trending values on each side may represent valve openings. On the decompression side 700, the darker symbols may represent the closing of the suction valve 116 in each chamber 106 and the lighter symbols may represent the opening of the discharge valve 118 in each chamber 106. On the compression side 702, the darker symbols may represent the closing of the discharge valve 118 in each chamber 106 and the lighter symbols may represent the opening of the suction valve 116 in each chamber 106.

The graph in FIG. 7 shows a deviation in the first seventy seconds of the diamond symbol (representing the suction valve 116 in a second chamber 106 of the pressure pump 100) from the other suction valves 116 in other chambers 106. In some aspects, the deviation may represent a leakage event in the suction valve 116. The trend of the deviation may be analyzed to determine the type of leak of the suction valve 116. For example, the deviation of the suction valve 116 for the second chamber 106 may represent a constant leak throughout the pump stroke of the plunger 114. This type of leak may have a small delay in sealing, a lower compression slope and an early decompression as shown in FIG. 7. The leak may be the result of damage to the face of the valve 116, 118.

FIG. 8 shows an alternative example of a valve delay. The darker symbols have lower-trending values on both the decompression side 800 (representing the closing of the suction valve 116 in each chamber 106) and the compression side 802 (representing the closing of the discharge valve 118 in each chamber 106). The lighter symbols have the higher-trending values on each side and may represent the opening of the discharge valve 118 and the suction valve 116 on the decompression side 800 and compression side 802, respectively. In some aspects, the graph in FIG. 8 may indicate an early onset of leakage of the discharge valve 118 for the first chamber 106 of the pressure pump 100. The leak may progress from what is depicted in FIG. 8 to a similar depiction in FIG. 7 until the chamber 106 will not fully load up, indicating a totally blown discharge valve 118. The damage may cause a delay in the sealing of the valve 116, 118 until a polymer seal of the valve 116, 118 extrudes into a gap of the chamber 106 to effectively seal the leak. Throughout the remainder of the pump cycle of the plunger 114, the compression may be normal until the leak repeats on the next cycle of the plunger 114. Progression of a valve 116, 118 to total failure may be dangerous to the entire pressure pump 100. Although FIGS. 7 and 8 are discussed with respect to indications of a potential leak in one of the valves 116, 118, the monitoring system 200 may determine a number of conditions of the pressure pump 100 without departing from the scope of the present disclosure.

In some aspects, the valve actuation points 502, 504, 506, 508 may be compared to expected actuation values for the valve 116, 118 to determine an expected valve delay. The expected values may be determined from fluid properties such as bulk modulus. In some aspects, calibrations may be necessary for a particular pressure pump 100 to quantify the effective modulus of the pump. The calibration may be combined with the fluid modulus delivering the expected values.

Figure 9:
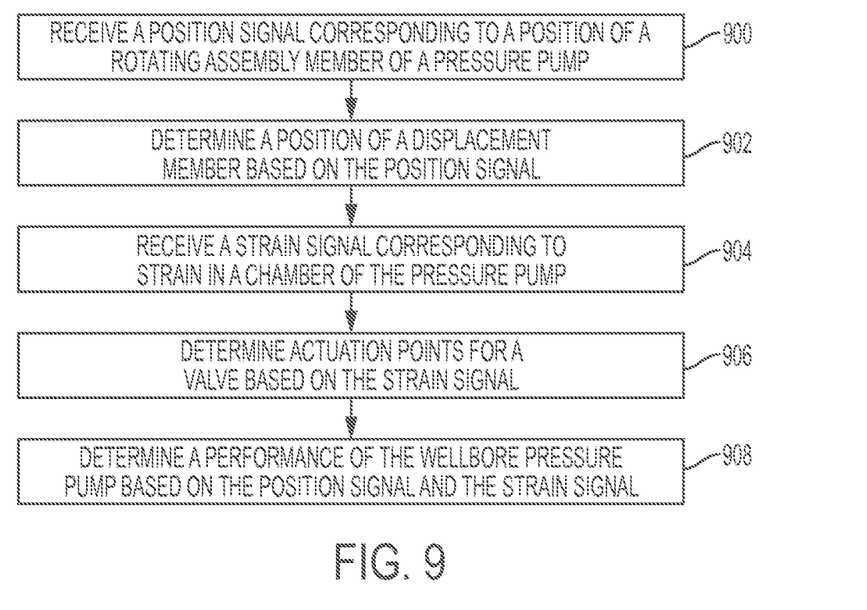
FIG. 9 is a flowchart describing a process for monitoring a valve of a pressure pump according to one aspect of the present disclosure.

FIG. 9 is a flowchart showing a process for monitoring the suction valve 116 or the discharge valve 118 to determine the performance of the chamber 106 during operation of the pressure pump 100. The process is described with respect to the monitoring system 200 shown in FIG. 2, although other implementations are possible without departing from the scope of the present disclosure.

In block 900, the computing device 206 may receive a position signal 300, 400 from the position sensor 202. In some aspects, the received signal may be similar to position signal 300 and may be received from the position sensor 202 sensing the position of a member of the rotating assembly (e.g., the crankshaft 108) of the pressure pump 100. In some aspects, the position sensor 202 may sense the position of the crankshaft 108 from a position proximate to the path of the crosshead 112 as described with respect to FIG. 3. In other aspects, the received signal may be similar to position signal 400 and may be received from the position sensor 202 sensing the position of the crankshaft 108 from being directly positioned on a crankcase of the crankshaft 108 as described with respect to FIG. 4.

In block 902, the computing device 206 may determine the position of plunger 114, piston, or other displacement member in the chamber 106 based on the position signal 300, 400. For example, the plunger 114 may be mechanically coupled to the crankshaft 108 in a manner that the movement or position of the plunger 114 is directly related to the movement or position of the crankshaft 108. Based on the mechanical coupling of the crankshaft 108 and the plunger 114, the computing device 206 may determine plunger position reference points 302, 304, 402, 404 corresponding to the position of the plunger 114 at various times during operation of the crankshaft 108 or pressure pump 100. For example, the computing device 206 may reference points 302, 304 representing the top dead center and bottom dead center positions of the plunger 114, respectively.

In block 904, the processor 208 may receive the strain signal 500 from the strain gauge 204. The strain gauge 204 may be positioned on the fluid end 104 of the pressure pump 100 and generate the strain signal 500 corresponding to strain in the chamber 106 of the pressure pump 100. The strain signal 500 may represent a characterization of the strain in the chamber 106 as the suction valve 116 and the discharge valve 118 actuate (e.g., open or close) in response to the operation of the plunger 114 in the chamber 106.

In block 906, the computing device 206 may determine the actuation points 502, 504, 506, 508 for the suction valve 116 and the discharge valve 118. In some aspects, the computing device 206 may determine actuation points 502, 504, 506, 508 based on the discontinuities in the strain signal 500 as described with respect to FIG. 5. The actuation points 502, 508 may represent the closing and opening of the suction valve 116, respectively. The actuation points, 504, 506 may represent the opening and closing of the discharge valve 118, respectively.

In block 908, the computing device 206 may determine the performance of the chamber 106 based on the position of the plunger 114 and the actuation points 502, 504, 506, 508 for the valves 116, 118. The computing device 206 may correlate the reference points 302/402, 304/404 corresponding to the position of the plunger 114 and derived from the position signal 300/400 with the actuation points 502, 504, 506, 508 corresponding to the actuation of the suction valve 116 and discharge valve 118. The time between the reference point 304/404 of the position of the plunger 114 and the actuation points 502, 504 may represent the delays in the closing of the suction valve 116 and opening of the discharge valve 118, respectively. Similarly, the time between the reference point 302/402 of the position of the plunger 114 and the actuation points 506, 508 may represent the delays in the closing of the discharge valve 118 and the opening of the suction valve 116, respectively. In some aspects, the delays may be compared with known or expected actuation delays for the suction valve 116 and the discharge valve 118 to determine the performance of the chamber 106 as described herein. In additional and alternative aspects, the computing device 206 may cause the actuation points 502, 504, 506, 508 of the suction valve 116 and the discharge valve 118 to be displayed by the display unit 214 in reference to the bottom dead center or top dead center of the plunger 114 as shown in FIGS. 6-8.

In some aspects, a pump monitoring systems are provided according to one or more of the following examples:

Example #1

A monitoring system for use in wellbore treatment operations may include a strain gauge. The strain gauge may be positionable on a fluid end of a pump to measure strain in a chamber of the pump and generate a strain signal representing strain in the chamber. The strain signal may be usable in determining actuation points for a valve in the chamber. The monitoring system may also include a position sensor. The position sensor may be positionable on a power end of the pump to sense a position of a member of a rotating assembly of the pump and generate a position signal representing the position of the member during operation of the pump. The monitoring system may also include a computing device couplable to the strain gauge and the position sensor. The computing device may include a processing device for which instructions executable by the processing device are used to cause the processing device to determine a performance of the chamber of the pump based on the actuation points for the valve and the position of the plunger.

Example #2

The monitoring system of Example #1 may feature the strain gauge being positionable on an external surface of the fluid end of the pump to measure the strain in the chamber of the pump.

Example #3

The monitoring system of Examples #1-2 may feature the position sensor being positionable proximate to a path of a crosshead coupled to the crankshaft to determine the position of the crankshaft.

Example #4

The monitoring system of Examples #1-2 may feature the position sensor being positionable on a crankcase of the crankshaft to determine a bolt pattern representing the position of the crankshaft.

Example #5

The monitoring system of Examples #1-4 may feature the actuation points including points corresponding to an opening and a closing of the valve. A memory device may comprise instructions executable by the processing device for causing the processing device to determine the actuation points based on discontinuities in the strain signal.

Example #6

The monitoring system of Examples #1-5 may feature the memory device comprising instructions executable by the processing device for causing the processing device to determine the position of the plunger by correlating the position of the crankshaft with a ratio representing a mechanical correlation of the plunger to the crankshaft. The memory device may also comprise instructions executable by the processing device for causing the processing device to determine a delay in the opening or the closing of the valve corresponding to a condition of the chamber by correlating the position of the plunger with the actuation points.

Example #7

The monitoring system of Examples #1-6 may also include a display unit couplable to the computing device. A memory device may comprise instructions executable by the processing device for causing the processing device to generate a graphical representation of the strain signal having the actuation points representing an opening and a closing of the valve during operation of the plunger in the chamber of the pump.

Example #8

The monitoring system of Examples #1-7 may also include a display unit couplable to the computing device. A memory device may comprise instructions executable by the processing device for causing the processing device to generate a graphical representation of the actuation points plotted relative to a first plunger position reference point or a second plunger position reference point corresponding the position of the plunger during operation. A distance between the first plunger position reference point and the second plunger position reference point may represent a full stroke length of the plunger.

Example #9

The monitoring system of Examples #1-8 may feature the pump coupled to a wellbore. The pump may be operated to inject fluid into the wellbore to stimulate a production from formations located adjacent to the wellbore.

Example #10

A pumping system may comprise the pump being couplable to a wellbore. The pump may include a fluid end and a power end. The fluid end of the pump may include a valve actuatable between a first actuation point and a second actuation point in a chamber of the pump through a valve transition between the first actuation point and the second actuation point that is measurable by a strain gauge. The fluid end may further include a plunger in the chamber. The plunger may be mechanically coupled to a crankshaft in the power end of the pump and actuatable between a first reference point and a second reference point through a plunger transition between the first reference point and the second reference point that is measurable by a position sensor. The pumping system may also include a computing device that may be couplable to the pump. The computing device may include a processing device for which instructions executable by the processing device are used to cause the processing device to determine a performance of the chamber by correlating at least one of the first actuation point or the second actuation point with at least one of the first reference point or the second reference point.

Example #11

The pumping system of Example #10 may feature a memory device comprising instructions executable by the processing device for causing the processing device to determine the first actuation point and the second actuation point of a valve by identifying discontinuities in a strain signal received from the strain gauge and representing strain in the chamber during operation of the plunger.

Example #12

The pumping system of Examples #10-11 may feature the first reference point corresponding to a first plunger position and the second reference point corresponds to a second plunger position. A distance between the first plunger position and the second plunger position may represent a full stroke length of the plunger. A memory device may comprise instructions executable by the processing device for causing the processing device to determine the first reference point and the second reference point of the plunger by correlating a position signal received from the position sensor and representing a position of the crankshaft with a ratio representing a mechanical correlation of the plunger to the crankshaft.

Example #13

The pumping system of Examples #10-12 may also include the strain gauge and the position sensor. The strain gauge may be couplable to the pump and the computing device. The strain gauge may be positionable on an external surface of the fluid end of the pump to measure a strain in the chamber of the pump and generate a strain signal representing the strain in the chamber. The position sensor may be couplable to the pump and the computing device. The position sensor may be positionable on an external surface of the power end of the pump to sense a position of the crankshaft and generate a position signal corresponding to the position of the crankshaft.

Example #14

The pumping system of Examples #10-13 may feature the valve being a passive valve actuatable in response to a stroke of the plunger in the chamber.

Example #15

The pumping system of Examples #10-14 may also include a display unit couplable to the computing device. A memory device may comprise instructions executable by the processing device for causing the processing device to generate a graphical representation of a strain signal received by the computing device from the strain gauge. The graphical representation may include the first actuation point and the second actuation point overlaid on the strain signal and positioned at one or more discontinuities in the strain signal. The graphical representation may also include the first reference point and the second reference point overlaid on the strain signal. A distance between at least one of the first actuation point or the second actuation point and one of the first reference point or the second reference point may correspond to a delay in an opening or closing of the valve.

Example #16

The pumping system of Example #15 may feature a memory device comprising instructions executable by the processing device for causing the processing device to compare the delay in the opening or closing of the valve to an expected delay for the valve.

Example #17

A method for monitoring a valve for a pump may include receiving, from a position sensor coupled to an external surface of a power end of the pump, a position signal representing a position of a member of a rotating assembly of the pump. The method may also include determining, by a computing device, a position of a displacement member in a chamber of the pump based on the position signal. The method may also include receiving, from a stain gauge coupled to an external surface of a fluid end of the pump, a strain signal representing strain in the chamber of the pump. The method may also include determining, by the computing device, actuation points corresponding to an opening or closing of the valve in the chamber of the pump based on the strain signal. The method may also include determining, by the computing device, a performance of the pump based on the position of the displacement member and the actuation points.

Example #18

The method of Example #17 may feature the displacement member being a plunger. The method may also feature determining the position of the displacement member to include correlating the position of the member with a ratio representing a mechanical correlation of the plunger to the rotating assembly.

Example #19

The method of Examples #17-18 may feature determining the actuation points for the valve to include identifying discontinuities in the strain signal Example #20

The method of Examples #17-19 may feature determining the performance of the pump to include determining a first reference point corresponding to a first position of the displacement member and a second reference point corresponding to a second position of the displacement member. A distance between the first reference point and the second reference point may represent a full stroke length of the displacement member. Determining the performance of the pump may also include determining a delay in an actuation of the valve by correlating at least one of the first reference point or the second reference point with at least one of the actuation points. Determining the performance of the pump may also include comparing the delay to an expected delay to determine a condition in the chamber.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A monitoring system for use in wellbore operations, comprising:
   a strain gauge positioned on a fluid end of a pump to measure strain associated with a chamber of the pump and generate a strain signal representing the strain;
   a position sensor positioned on a power end of the pump to sense a position of a member of a rotating assembly of the pump and generate a position signal representing the position of the member during operation of the pump;
   a computing device coupled to the strain gauge and the position sensor, the computing device including a processing device and a memory device, the memory device including instructions that are executable by the processing device for causing the processing device to:
   receive the strain signal from the strain gauge;
   determine actuation points corresponding to an opening or closing of a valve in the chamber of the pump based on the strain signal;
   receive the position signal representing the position of the member;
   determine the position of the member based on the position signal; and
   determine a performance of the chamber of the pump based on the actuation points for the valve and the position of the member.

2. The monitoring system of claim 1, wherein the strain gauge is positioned on an external surface of the fluid end of the pump to measure the strain associated with the chamber of the pump.

3. The monitoring system of claim 1, wherein the position sensor is positioned proximate to a path of the rotating assembly to determine the position of the member.

4. The monitoring system of claim 1, wherein the position sensor is positioned on a crankcase of a crankshaft of the rotating assembly to determine a bolt pattern representing the position of the member.

5. The monitoring system of claim 1, wherein the actuation points include points corresponding to an opening and a closing of the valve, and wherein the memory device further includes instructions that are executable by the processing device for causing the processing device to determine the actuation points based on discontinuities in the strain signal.

6. The monitoring system of claim 5, wherein the memory device further comprises instructions that are executable by the processing device for causing the processing device to:
   determine the position of a plunger in the chamber by correlating the position of the member with a ratio representing a mechanical correlation of the plunger to the member; and
   determine a delay in the opening or the closing of the valve corresponding to a condition of the chamber by correlating the position of the plunger with the actuation points.

7. The monitoring system of claim 1, further including a display unit coupled to the computing device, wherein the memory device further includes instructions that are executable by the processing device for causing the processing device to generate a graphical representation of the strain signal having the actuation points representing an opening and a closing of the valve during operation of the pump.

8. The monitoring system of claim 1, further including a display unit coupled to the computing device, wherein the memory device further includes instructions that are executable by the processing device for causing the processing device to generate a graphical representation of the actuation points plotted relative to a first plunger position reference point or a second plunger position reference point corresponding the position of a plunger in the chamber during operation of the pump, wherein a distance between the first plunger position reference point and the second plunger position reference point represents a full stroke length of the plunger.

9. The monitoring system of claim 1, wherein the pump is coupled to a wellbore and the pump is operated to inject fluid into the wellbore to stimulate production from formations located adjacent to the wellbore.

10. The monitoring system of claim 1, wherein the strain gauge is positioned on a wall of the chamber.

11. A pumping system, comprising:
   a pump including a fluid end and a power end, the fluid end of the pump including a valve actuatable between a first actuation point and a second actuation point in a chamber of the pump through a valve transition between the first actuation point and the second actuation point that is measurable by a strain gauge, the fluid end further including a plunger in the chamber, the plunger being mechanically coupled to a crankshaft in the power end of the pump and actuatable between a first reference point and a second reference point through a plunger transition between the first reference point and the second reference point that is measurable by a position sensor;
   a computing device including a processing device and a memory device, the memory device including instructions that are executable by the processing device for causing the processing device to:
   receive a strain signal from the strain gauge, the strain signal representing a strain associated with the chamber of the pump;
   determine the first actuation point and the second actuation point based on the strain signal;
   receive a position signal from the position sensor;
   determine the first reference point and the second reference point of the plunger based on the position signal; and
   determine a performance of the chamber by correlating at least one of the first actuation point or the second actuation point with at least one of the first reference point or the second reference point.

12. The pumping system of claim 11, wherein the memory device further includes instructions that are executable by the processing device for causing the processing device to determine the first actuation point and the second actuation point of the valve by identifying discontinuities in the strain signal received from the strain gauge and representing the strain associated with the chamber during operation of the plunger.

13. The pumping system of claim 11, wherein the first reference point corresponds to a first plunger position and the second reference point corresponds to a second plunger position, a distance between the first plunger position and the second plunger position representing a full stroke length of the plunger, wherein the memory device further includes instructions that are executable by the processing device for causing the processing device to determine the first reference point and the second reference point of the plunger by correlating (i) the position signal received from the position sensor and representing a position of the crankshaft with (ii) a ratio representing a mechanical correlation of the plunger to the crankshaft.

14. The pumping system of claim 11, wherein the strain gauge is positioned on an external surface of the fluid end of the pump to measure the strain associated with the chamber of the pump and generate the strain signal representing the strain associated with the chamber, and wherein the position sensor is positioned on an external surface of the power end of the pump to sense a position of the crankshaft and generate the position signal corresponding to the position of the crankshaft.

15. The pumping system of claim 11, wherein the valve is a passive valve that is actuatable in response to a stroke of the plunger in the chamber.

16. The pumping system of claim 11, further comprising a display unit coupled to the computing device, wherein the memory device further includes instructions that are executable by the processing device for causing the processing device to generate a graphical representation of the strain signal received by the computing device from the strain gauge, the graphical representation including the first actuation point and the second actuation point overlaid on the strain signal and positioned at one or more discontinuities in the strain signal, the graphical representation further including the first reference point and the second reference point overlaid on the strain signal, a distance between at least one of the first actuation point or the second actuation point and one of the first reference point or the second reference point corresponding to a delay in an opening or closing of the valve.

17. The pumping system of claim 16, wherein the memory device further comprises instructions executable by the processing device for causing the processing device to compare the delay in the opening or closing of the valve to an expected delay for the valve.

18. A method for monitoring a valve for a pump, comprising:
    receiving, from a position sensor coupled to a power end of the pump, a position signal representing a position of a member of a rotating assembly of the pump;
    determining, by a computing device, a position of a displacement member in a chamber of the pump based on the position signal;
    receiving, from a strain gauge coupled to an external surface of a fluid end of the pump, a strain signal representing strain in the chamber of the pump;
    determining, by the computing device, actuation points corresponding to an opening or closing of the valve in the chamber of the pump based on the strain signal; and
    determining, by the computing device, a performance of the pump based on the position of the displacement member and the actuation points.

19. The method of claim 18, wherein the displacement member is a plunger, wherein determining the position of the displacement member includes correlating the position of the member of the rotating assembly with a ratio representing a mechanical correlation of the plunger to the rotating assembly.

20. The method of claim 18, wherein determining the actuation points for the valve includes identifying discontinuities in the strain signal.

21. The method of claim 18, wherein determining the performance of the pump includes:
    determining a first reference point corresponding to a first position of the displacement member and a second reference point corresponding to a second position of the displacement member, wherein a distance between the first reference point and the second reference point represents a full stroke length of the displacement member;
    determining a delay in an actuation of the valve by correlating at least one of the first reference point or the second reference point with at least one of the actuation points; and
    comparing the delay to an expected delay to determine a condition in the chamber.

* * * * *